US012671100B2

(12) United States Patent
Yang et al.

(10) Patent No.: US 12,671,100 B2
(45) Date of Patent: Jun. 30, 2026

(54) FUEL CELL MEMBRANE HUMIDIFIER

(71) Applicant: KOLON INDUSTRIES, INC., Seoul (KR)

(72) Inventors: Hyoung Mo Yang, Seoul (KR); Woong Jeon Ahn, Seoul (KR); Do Woo Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 295 days.

(21) Appl. No.: 18/579,969

(22) PCT Filed: Aug. 19, 2022

(86) PCT No.: PCT/KR2022/012395
§ 371 (c)(1),
(2) Date: Jan. 17, 2024

(87) PCT Pub. No.: WO2023/033418
PCT Pub. Date: Mar. 9, 2023

(65) Prior Publication Data
US 2024/0339638 A1      Oct. 10, 2024

(30) Foreign Application Priority Data
Aug. 31, 2021      (KR) ........................ 10-2021-0115980

(51) Int. Cl.
*H01M 8/04* (2016.01)
*H01M 8/04119* (2016.01)
*H01M 8/10* (2016.01)
(52) U.S. Cl.
CPC .................. *H01M 8/04149* (2013.01); *H01M 2008/1095* (2013.01)

(58) Field of Classification Search
CPC ................................................ H01M 8/04149
See application file for complete search history.

(56) References Cited

U.S. PATENT DOCUMENTS

| | | |
|---|---|---|
| 2016/0036073 A1 | 2/2016 | Kim |
| 2020/0052312 A1 | 2/2020 | Kim |

(Continued)

FOREIGN PATENT DOCUMENTS

| | | |
|---|---|---|
| JP | 2010-071619 A | 4/2010 |
| JP | 2010-146810 A | 7/2010 |

(Continued)

OTHER PUBLICATIONS

EESR dated Jul. 21, 2025.
KR Office Action dated Dec. 3, 2024.
Office Action from Japanese Patent Office, dated Nov. 18, 2024.

*Primary Examiner* — Robert A Hopkins
(74) *Attorney, Agent, or Firm* — Harvest IP Law, LLP

(57) ABSTRACT

Disclosed is a fuel cell membrane humidifier which may prevent degradation of efficiency, which is caused by an increase in differential pressure in the fuel cell membrane humidifier due to volume minimization of the fuel cell membrane humidifier. A disclosed fuel cell membrane humidifier performs moisture exchange between a first fluid and a second fluid and includes a mid-case, a second fluid inlet configured to introduce the second fluid into the mid-case, a second fluid outlet configured to discharge the second fluid to outside, a partition wall partitioning an inner space of the mid-case into a first space and a second space, and an active bypass portion configured to adjust a flow rate of the second fluid flowing in the first space and the second space according to a flow rate of the second fluid introduced through the second fluid inlet.

5 Claims, 5 Drawing Sheets

(56)                    References Cited

U.S. PATENT DOCUMENTS

| | | | |
|---|---|---|---|
| 2020/0266464 | A1 | 8/2020 | Kim |
| 2021/0050607 | A1 | 2/2021 | Kim |
| 2022/0344684 | A1 | 10/2022 | Ahn |

FOREIGN PATENT DOCUMENTS

| | | | | | |
|---|---|---|---|---|---|
| JP | 2011-089749 | A | | 5/2011 | |
| KR | 10-1795224 | B1 | | 11/2017 | |
| KR | 10-2018-0001227 | A | | 1/2018 | |
| KR | 10-2018-0077721 | A | | 7/2018 | |
| KR | 10-2020-0017059 | A | | 2/2020 | |
| KR | 10-2020-0055345 | A | | 5/2020 | |
| KR | 10-2021-0011204 | A | | 2/2021 | |
| KR | 20210011204 | A | * | 2/2021 | ........ H01M 8/04149 |
| KR | 10-2021-0067366 | A | | 6/2021 | |
| WO | 2013-137313 | A1 | | 9/2013 | |

* cited by examiner

FIG. 6

FIG. 7
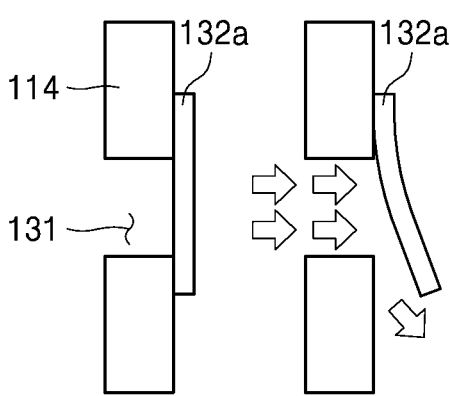
FIG. 8
FIG. 9
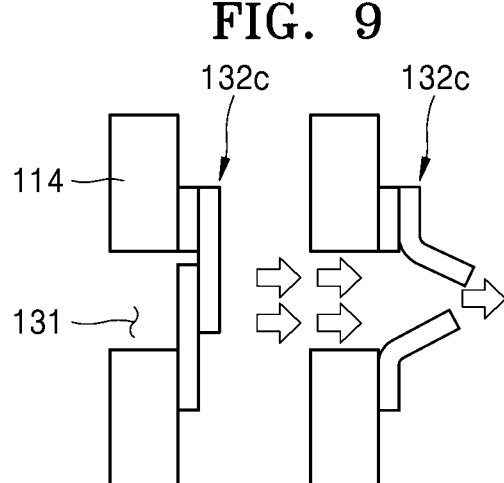

FUEL CELL MEMBRANE HUMIDIFIER

CROSS REFERENCE TO RELATED APPLICATION(S)

This application is a National Stage of International Application No. PCT/KR2022/012395 filed on Aug. 19, 2022, claiming priority based on Korean Patent Application No. 10-2021-0115980 filed on Aug. 31, 2021, the disclosure of which is incorporated herein by reference in their entirety.

TECHNICAL FIELD

The present disclosure relates to a fuel cell membrane humidifier, and more particularly, to a fuel cell membrane humidifier which may prevent degradation of efficiency, which is caused by an increase in differential pressure in the fuel cell membrane humidifier due to volume minimization of the fuel cell membrane humidifier.

BACKGROUND ART

A fuel cell is a power-generating battery that produces electricity by combining hydrogen with oxygen. Unlike general chemical cells such as batteries or storage batteries, fuel cells can continuously produce electricity as long as hydrogen and oxygen are supplied thereto, and are about twice as efficient as internal combustion engines because there is no heat loss.

Furthermore, pollutant emissions are low because the chemical energy generated by the combination of hydrogen with oxygen is directly converted into electrical energy. Accordingly, fuel cells are not only environmentally friendly, but also have the advantage of reducing concerns about resource depletion due to increased energy consumption.

Fuel cells may be broadly classified into polymer electrolyte membrane fuel cells (PEMFC), phosphoric acid fuel cells (PAFC), molten carbonate fuel cells (MCFC), solid oxide fuel cells (SOFC), and alkaline fuel cells (AFC), depending on the type of electrolyte used.

The respective fuel cells operate fundamentally on the same principle, but differ in the type of fuel used, operating temperature, catalyst, electrolyte, and the like. Among these, the PEMFC is known to be the most promising not only for small stationary power generation equipment, but also for transportation systems because the PEMFC can operate at lower temperatures than other fuel cells and can be miniaturized due to its high-power density.

One of the most important factors in improving the performance of the PEMFC is to maintain the moisture content by supplying a certain amount of moisture to polymer electrolyte membranes or proton exchange membranes (PEM) of the membrane electrode assembly. This is because when the polymer electrolyte membranes become dry, power generation efficiency rapidly decreases.

Methods for humidifying the polymer electrolyte membranes include 1) a bubbler humidification method of supplying moisture by filling a pressure vessel with water and passing target gas through a diffuser, 2) a direct injection method of supplying moisture directly to a gas flow pipe through a solenoid valve after calculating the amount of moisture needed for the fuel cell reaction, and 3) a membrane humidification method of supplying moisture to a fluidized layer of gas by using a polymer separation membrane.

Among these, the membrane humidification method, whereby the polymer electrolyte membranes are humidified by providing water vapor to air supplied to the polymer electrolyte membranes by using membranes that selectively transmit only the water vapor contained in off-gas, is advantageous in that it can lighten and miniaturize the membrane humidifier.

When the selective permeable membranes used in the membrane humidification method are formed in a module, hollow fiber membranes with a large permeable area per unit volume are preferable. That is, when manufacturing a membrane humidifier using hollow fiber membranes, high integration of the hollow fiber membranes with a wide contact surface area is possible, which enables sufficient humidification of a fuel cell even with a small capacity, low-cost materials may be used, and moisture and heat contained in off-gas discharged at high temperature from the fuel cell may be recovered and reused through the membrane humidifier.

DISCLOSURE

Technical Problem

The object of the present disclosure is to provide a fuel cell membrane humidifier which may prevent degradation of efficiency, which is caused by an increase in differential pressure in the fuel cell membrane humidifier due to volume minimization of the fuel cell membrane humidifier.

Technical Solution

A fuel cell membrane humidifier according to an embodiment of the present disclosure performs moisture exchange between a first fluid and a second fluid and includes a mid-case, a second fluid inlet configured to introduce the second fluid into the mid-case, a second fluid outlet configured to discharge the second fluid to outside, a partition wall partitioning an inner space of the mid-case into a first space and a second space, and an active bypass portion configured to adjust a flow rate of the second fluid flowing in the first space and the second space according to a flow rate of the second fluid introduced through the second fluid inlet.

In the fuel cell membrane humidifier according to an embodiment of the present disclosure, the active bypass portion may include a bypass hole formed by penetrating the partition wall and a bypass hole opening/closing device configured to open/close the bypass hole according to a flow rate of the second fluid introduced through the second fluid inlet.

In the fuel cell membrane humidifier according to an embodiment of the present disclosure, the bypass hole opening/closing device may include a single valve member formed on the partition wall to cover the bypass hole.

In the fuel cell membrane humidifier according to an embodiment of the present disclosure, the bypass hole opening/closing device may include a dual valve member formed on the partition wall to cover the bypass hole from both sides.

In the fuel cell membrane humidifier according to an embodiment of the present disclosure, the bypass hole opening/closing device may include a double valve member formed on the partition wall to cover the bypass hole from both sides while at least partially overlapping each other.

In the fuel cell membrane humidifier according to an embodiment of the present disclosure, the bypass hole opening/closing device may include a flexible material having a shape that is deformed as a pressure applied thereto increases and returns to an original shape when the pressure decreases.

The fuel cell membrane humidifier according to an embodiment of the present disclosure may further include caps formed at both ends of the mid-case, and at least one cartridge arranged in the mid-case and configured to accommodate a plurality of hollow fiber membranes.

Other details of embodiments according to various aspects of the present disclosure are included in the detailed description below.

Advantageous Effects

According to an embodiment of the present disclosure, as a portion of a second fluid introduced into a fuel cell membrane humidifier bypasses a hollow fiber membrane depending on the flow rate of the second fluid and is discharged to the outside, an increase in differential pressure may be prevented. Accordingly, as an increase in differential pressure in the fuel cell membrane humidifier due to the volume minimization of the fuel cell membrane humidifier may be prevented, the overall humidification efficiency may be improved.

DESCRIPTION OF DRAWINGS

FIG. 6 is a cross-sectional view of a cartridge installed on a fuel cell membrane humidifier according to an embodiment of the present disclosure.

FIGS. 7 to 9 illustrate active bypass portions according to various embodiments.

MODE FOR INVENTION

Figure 1:
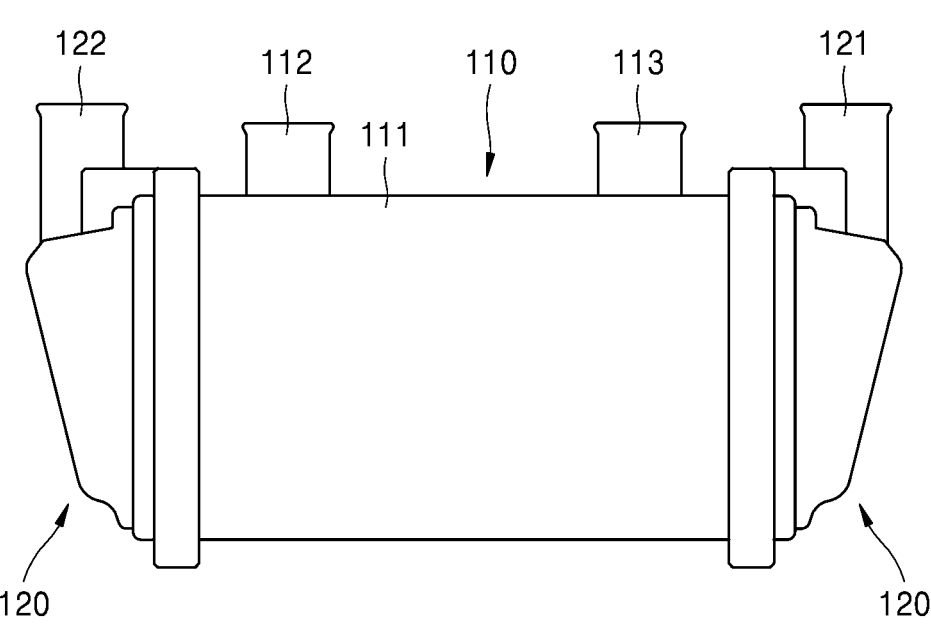
FIG. 1 is a front view of a fuel cell membrane humidifier according to an embodiment of the present disclosure.

As the present disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

The terms used in the present disclosure are merely used to describe particular embodiments, and are not intended to limit the disclosure. As used herein, the singular forms "a," "an," and "the" are intended to include the plural forms as well, unless the context clearly indicates otherwise. In the present disclosure, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Hereinafter, a fuel cell membrane humidifier according to an embodiment of the present disclosure will be described with reference to the accompanying drawings.

Figure 2:
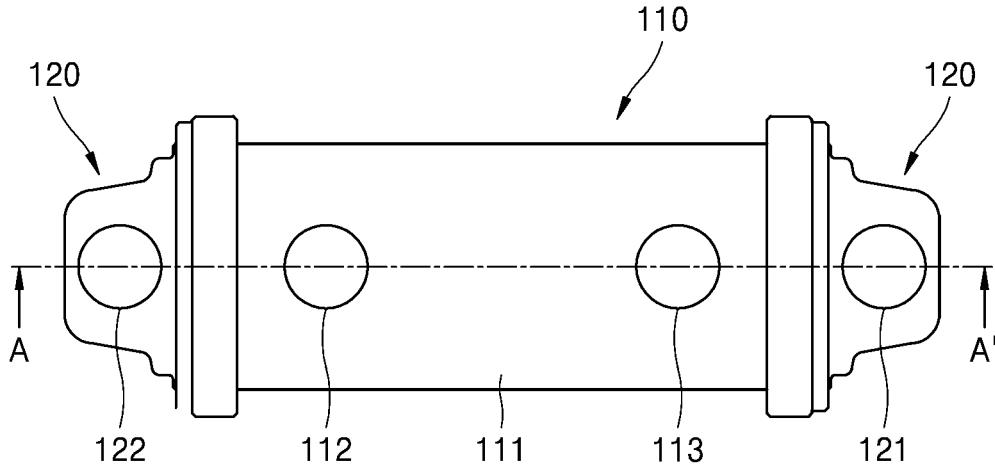
FIG. 2 is a plan view of a fuel cell membrane humidifier according to an embodiment of the present disclosure.
Figure 3:
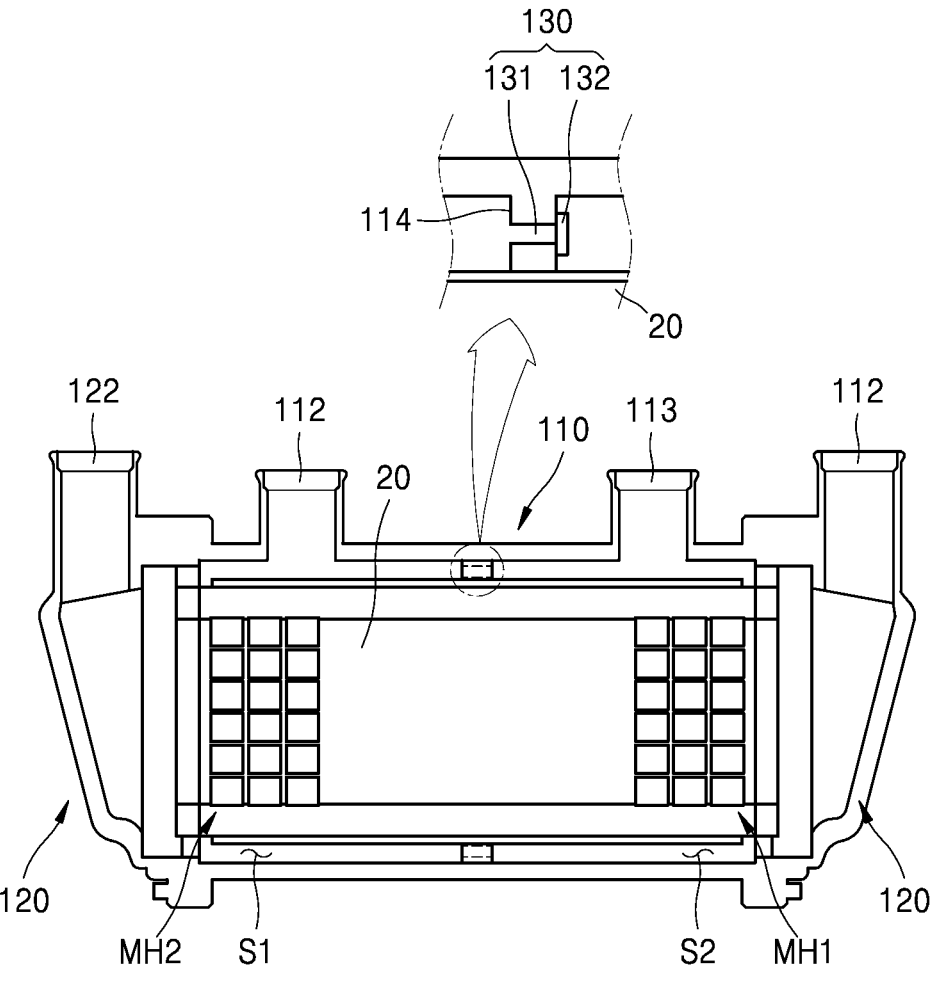
FIG. 3 is a cross-sectional view taken along line A-A' of FIG. 2.
Figure 4:
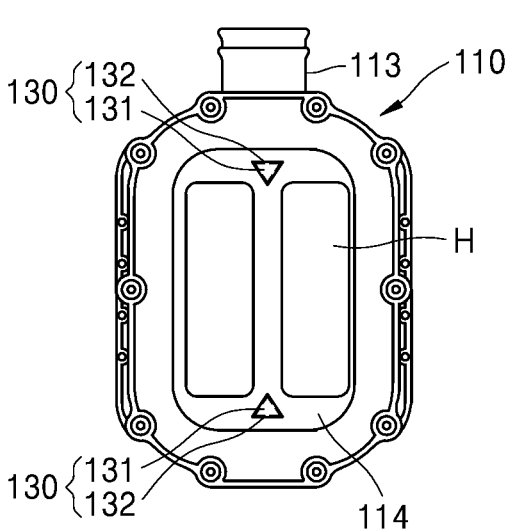
FIG. 4 is a side view of a humidification module with a cap removed from a fuel cell membrane humidifier according to an embodiment of the present disclosure.

FIG. 1 is a front view of a fuel cell membrane humidifier according to an embodiment of the present disclosure. FIG. 2 is a plan view of a fuel cell membrane humidifier according to an embodiment of the present disclosure. FIG. 3 is a cross-sectional view taken along line A-A' of FIG. 2. FIG. 4 is a side view of a humidification module with a cap removed from a fuel cell membrane humidifier according to an embodiment of the present disclosure.

As illustrated in FIGS. 1 to 4, a fuel cell membrane humidifier according to an embodiment of the present disclosure includes a humidification module 110, caps 120, and an active bypass portion 130.

The humidification module 110 performs moisture exchange between a first fluid supplied from the outside and a second fluid discharged from a fuel cell stack (not shown). The caps 120 are fastened to both ends of the humidification module 110. While a first fluid inlet 121 for supplying a first fluid supplied from the outside to the humidification module 110 is formed in one of the caps 120, a first fluid outlet 122 for supplying the first fluid humidified by the humidification module 110 to the fuel cell stack is formed in another of the caps 120.

The humidification module 110 includes a mid-case 111 having a second fluid inlet 112 and a second fluid outlet 113, and at least one of a cartridge 20 arranged in the mid-case 111. The second fluid discharged from the fuel cell stack (not shown) is introduced through the second fluid inlet 112, performs moisture exchange in the humidification module 110, and then is discharged through the second fluid outlet 113.

In the present disclosure, the fluid introduced/discharged through the second fluid inlet 112 or the second fluid outlet 113 is not limited to the second fluid. Furthermore, the fluid introduced/discharged through the first fluid inlet 121 or the first fluid outlet 122 is not limited to the first fluid.

Depending on designs, one of the caps 120 may be configured to supply the second fluid to the humidification module 110 to flow inside a hollow fiber membrane, and the one may be configured to discharge the second fluid having undergone the moisture-exchange to the outside. Furthermore, in this case, the first fluid may be introduced through one of the second fluid inlet 112 and the second fluid outlet 113, and the first fluid that has been humidified by the humidification module 110 may be supplied to the fuel cell stack through the other thereof. The flow direction of the first fluid and the flow direction of the second fluid may be the same or opposite to each other.

The mid-case 111 and the caps 120 may be each independently formed of a hard plastic or metal, and may each have a circular or polygonal cross-section in a widthwise direction. The "circular" includes oval, and the "polygonal" includes a polygon with rounded corners. For example, the hard plastic may be polycarbonate, polyamide (PA), polyphthalamide (PPA), polypropylene (PP), or the like. An internal space of the mid-case 111 may be partitioned into a first space S1 and a second space S2 by a partition wall 114. The partition wall 114 may be provided with an insertion hole H into which at least one cartridge 20 is inserted.

Figure 5:
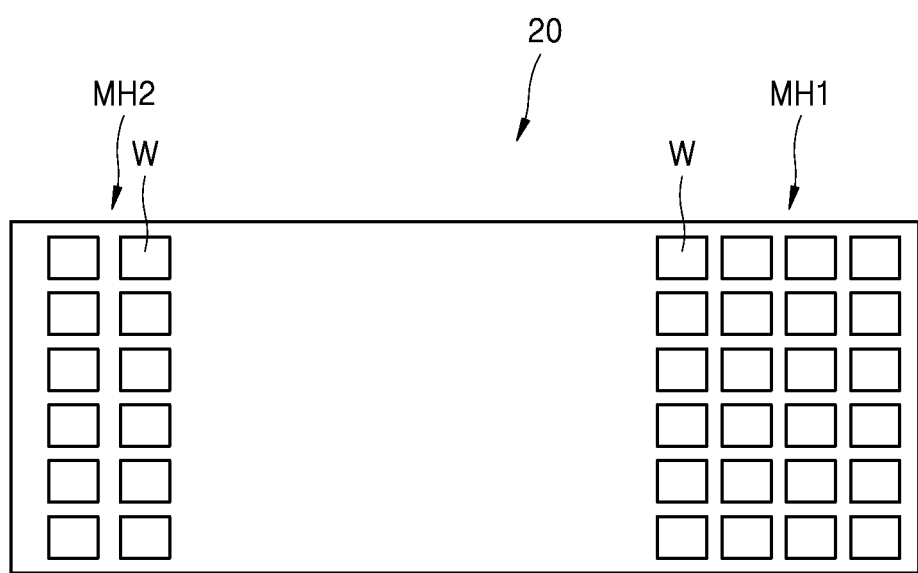
FIG. 5 is a side view of a cartridge installed on a fuel cell membrane humidifier according to an embodiment of the present disclosure.
Figure 6:
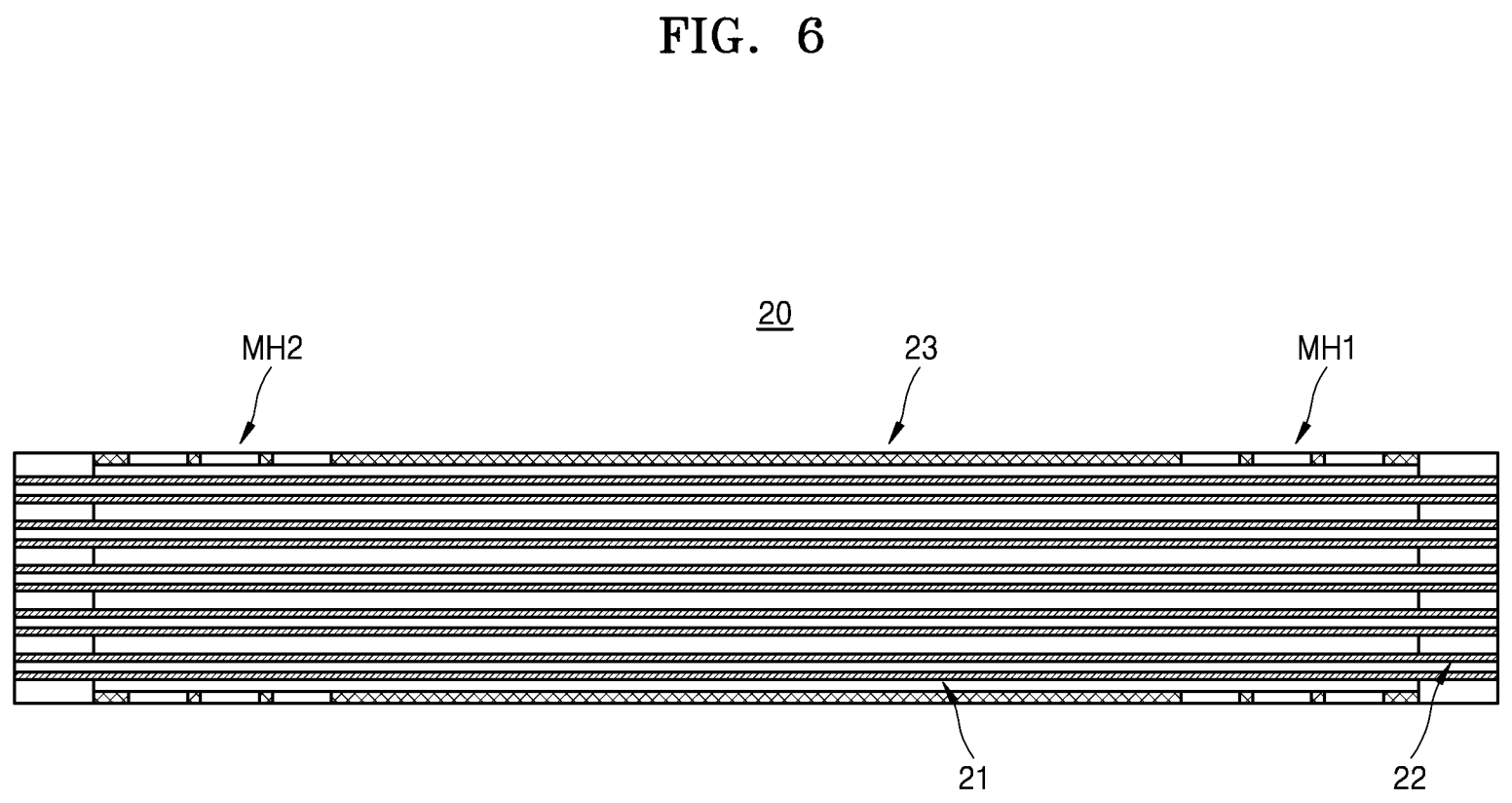

FIG. 5 is a side view of a cartridge installed on a fuel cell membrane humidifier according to an embodiment of the present disclosure. FIG. 6 is a cross-sectional view of the cartridge installed on a fuel cell membrane humidifier according to an embodiment of the present disclosure.

Referring to FIGS. 5 and 6, the cartridge 20 includes a plurality of hollow fiber membranes 21, a potting portion 22, and an inner case 23.

The hollow fiber membranes 21 may each include polysulfone resin, polyethersulfone resin, sulfonated polysulfone resin, polyvinylidene fluoride (PVDF) resin, polyacrylonitrile (PAN) resin, polyimide resin, polyamideimide resin, polyesterimide resin, or a polymer film formed of a mixture of at least two selected therefrom.

The potting portion 22 fixes ends of the hollow fiber membrane 21. The potting portion 22 may be formed by curing a liquid resin such as liquid polyurethane resin by a casting method such as deep potting or centrifugal potting.

The inner case 23 has an opening at each end, and the hollow fiber membranes 21 are accommodated in the opening. The potting portion 22 in which the ends of the hollow fiber membranes 21 are potted closes the openings of the inner case 131. The inner case 23 includes a first mesh hole portion MH1 arranged in a mesh form for fluid communication with the first space S1, and a second mesh hole portion MH2 arranged in a mesh form for fluid communication with the second space S2.

The second fluid introduced into the first space S1 of the mid-case 111 through the second fluid inlet 112 flows in the inner case 23 through the first mesh hole portion MH1 and then comes into contact with the outer surfaces of the hollow fiber membranes 21. Subsequently, the second fluid having undergone the moisture exchange exits to the second space S2 through the second mesh hole portion MH2 and is then discharged from the mid-case 111 through the second fluid outlet 113.

Meanwhile, when the flow direction of the second fluid is opposite to the flow direction of the first fluid introduced into the first fluid inlet 121, the second fluid introduced into the second space S2 of the mid-case 111 through the second fluid outlet 113 flows in the inner case 23 through the second mesh hole portion MH2 and then comes into contact with the outer surfaces of the hollow fiber membranes 21. Subsequently, the second fluid having undergone the moisture exchange with the first fluid exits to the first space S1 through the first mesh hole portion MH1 and is then discharged from the mid-case 111 through the second fluid into 112.

A gasket (not shown) may be provided between the mid-case 111 and the cartridge 20. The gasket mounts the cartridge 20 on the humidification module 110 through mechanical assembling. Accordingly, when an abnormality occurs in a specific portion (e.g., the cartridge 20) of the humidification module 110, the mid-case 111 and gasket 130 may be simply mechanically separated from the humidification module 110, and then, only the corresponding portion may be repaired or replaced.

FIGS. 7 to 9 illustrate active bypass portions according to various embodiments. The active bypass portion 130 adjusts a flow rate of the second fluid flowing in the first space S1 and the second space S2 according to a flow rate of the second fluid introduced through the second fluid inlet 112. The active bypass portion 130 includes a bypass hole 131 and a bypass hole opening/closing device 132.

The bypass hole 131 is formed by penetrating the partition wall 114. The bypass hole 131 may be formed in various polygonal or circular shapes, such as a triangle, a rectangle, a circle, an oval, and the like.

The bypass hole opening/closing device 132 is formed of a flexible material having a shape that is deformed as a pressure applied thereto increases and returns to the original shape when the pressure decreases. For example, the bypass hole opening/closing device 132 may be formed as an elastic valve formed of an elastic material (e.g., rubber).

The bypass hole opening/closing device 132 formed as an elastic valve opens/closes the bypass hole 131 according to according to the flow rate of the second fluid introduced through the second fluid inlet 112.

When the flow rate of the second fluid increases, pressure increases according to an increased flow rate, and thus, the elastic valve is deformed in a pressure direction, thereby at least partially opening the bypass hole 131. When the flow rate of the second fluid decreases, pressure decreases according to a decreased flow rate, and thus, the elastic valve is returned to the original direction, thereby at least partially closing the bypass hole 131.

As illustrated in FIG. 7, the active bypass portion 130 may include the bypass hole 131 and a single valve member 132a formed on the partition wall 114 to cover the bypass hole 131. As it is sufficient that the single valve member 132a is formed only at one side of the vicinity of the bypass hole 131, it is advantageous that a manufacturing process is simple. It may be the most basic shape of the active bypass portion 130.

As illustrated in FIG. 8, the active bypass portion 130 may include the bypass hole 131 and a dual valve member 132b formed on the partition wall 114 to cover the bypass hole 131 from both sides. As the dual valve member 132b is formed at both sides of the vicinity of the bypass hole 131, a change in the flow rate of the second fluid may be responded more sensitively. The dual valve member 132b may be more advantageous when the volume of the fuel cell membrane humidifier is less than a basic type.

As illustrated in FIG. 9, the active bypass portion 130 may include the bypass hole 131 and a double valve member 132c formed on the partition wall 114 to cover the bypass hole 131 from both sides while at least a portion of the members overlapping each other. As the double valve member 132c is configured to at least partially overlap each other, a change in the flow rate of the second fluid may be responded more insensitively. The double valve member 132c may be more advantageous when the volume of the fuel cell membrane humidifier is greater than the basic type.

A portion of the second fluid introduced through the second fluid inlet 112 flows from the first space S1 to the second space S2 through the active bypass portion 130 according to the flow rate of the second fluid and is discharged through the second fluid outlet 113. The second fluid introduced through the active bypass portion 130 is not in contact with the first fluid, moisture exchange is not performed.

Meanwhile, when the volume of the fuel cell membrane humidifier is minimized, a differential pressure in the fuel cell membrane humidifier is increased by the second fluid introduced from the fuel cell stack. As the increased differential pressure have an adverse effect on the efficiency of the fuel cell membrane humidifier, the differential pressure needs to be removed. As the active bypass portion 130 allows a portion of the introduced second fluid to bypass the hollow fiber membrane according to the flow rate of the second fluid and to be discharged to the outside, an increase in differential pressure may be prevented.

Accordingly, the fuel cell membrane humidifier including the active bypass portion 130 according to embodiments of the present disclosure is advantageous in the volume minimization.

While the embodiments of the present disclosure have been described, it will be understood by those of ordinary skill in the art that various modifications and changes may be made therein through inclusion, alteration, removal or addition of elements without departing from the spirit and scope of the present disclosure as defined by the following claims. Furthermore, it will be understood that this also falls within the scope of the present disclosure.

[LIST OF REFERENCE NUMERALS]

| | |
|---|---|
| 110: humidification module | 111: mid-case |
| 112: second fluid inlet | 113: second fluid outlet |
| 114: partition wall | 120: cap |
| 130: active bypass portion | |
| 131: bypass hole | 132: bypass hole opening/closing |
| 20: cartridge | 21: hollow fiber membranes |
| 22: potting portion | 23: inner case |
| MH1: first mesh hole portion | MH2: second mesh hole portion |

The invention claimed is:

1. A fuel cell membrane humidifier performing moisture exchange between a first fluid and a second fluid and comprising:
a mid-case;
a second fluid inlet configured to introduce the second fluid into the mid-case;
a second fluid outlet configured to discharge the second fluid to outside;
a partition wall partitioning an inner space of the mid-case into a first space and a second space; and
an active bypass portion configured to adjust a flow rate of the second fluid flowing in the first space and the second space according to a flow rate of the second fluid introduced through the second fluid inlet,
wherein the active bypass portion comprises;
a bypass hole formed by penetrating the partition wall; and
a bypass hole opening/closing device configured to open/ close the bypass hole according to a flow rate of the second fluid introduced through the second fluid inlet,

wherein the bypass hole opening/closing device comprises a dual valve member formed on the partition wall to cover the bypass hole from both sides.

2. The fuel cell membrane humidifier of claim 1, wherein the bypass hole opening/closing device comprises a single valve member formed on the partition wall to cover the bypass hole.

3. The fuel cell membrane humidifier of claim 1, wherein the bypass hole opening/closing device comprises a flexible material having a shape that is deformed as a pressure applied thereto increases and returns to an original shape when the pressure decreases.

4. The fuel cell membrane humidifier of claim 1, further comprising:
caps formed at both ends of the mid-case; and
at least one cartridge arranged in the mid-case and configured to accommodate a plurality of hollow fiber membranes.

5. A fuel cell membrane humidifier performing moisture exchange between a first fluid and a second fluid and comprising:
a mid-case;
a second fluid inlet configured to introduce the second fluid into the mid-case;
a second fluid outlet configured to discharge the second fluid to outside;
a partition wall partitioning an inner space of the mid-case into a first space and a second space; and
an active bypass portion configured to adjust a flow rate of the second fluid flowing in the first space and the second space according to a flow rate of the second fluid introduced through the second fluid inlet,
wherein the active bypass portion comprises:
a bypass hole formed by penetrating the partition wall; and
a bypass hole opening/closing device configured to open/ close the bypass hole according to a flow rate of the second fluid introduced through the second fluid inlet,
wherein the bypass hole opening/closing device comprises a double valve member formed on the partition wall to cover the bypass hole from both sides while at least a portion of the members overlapping each other.

* * * * *